United States Patent [19]
Davis

[11] Patent Number: 5,296,799
[45] Date of Patent: Mar. 22, 1994

[54] ELECTRIC POWER SYSTEM

[76] Inventor: Emsley A. Davis, 1805 Park La., Wellington, Tex. 79095

[21] Appl. No.: 953,461

[22] Filed: Sep. 29, 1992

[51] Int. Cl.[5] .............................................. H02P 9/00
[52] U.S. Cl. ........................................ 322/35; 60/412; 290/52
[58] Field of Search ...................... 322/35, 38; 290/43, 290/44, 52, 54; 60/407, 410, 412

[56] References Cited

U.S. PATENT DOCUMENTS

| | | | |
|---|---|---|---|
| 1,251,849 | 1/1918 | Vernon | 60/410 |
| 2,839,269 | 6/1958 | Gillen | 60/412 X |
| 4,124,978 | 11/1978 | Wagner | 60/412 X |
| 4,208,592 | 6/1980 | Liebow et al. | 290/52 |
| 4,322,673 | 3/1982 | Dukess | 322/35 |
| 4,769,988 | 9/1988 | Clark, Jr. | 60/412 X |

FOREIGN PATENT DOCUMENTS 1097403  3/1981  Canada ................................. 322/38

Primary Examiner—Kristine L. Peckman
Attorney, Agent, or Firm—Geoffrey A. Mantooth

[57] ABSTRACT

An electric power system has an air compressor unit with a reservoir tank, an air powered motor and an electric generator. The air compressor unit has an air compressor that provides compressed air to the reservoir tank. The air compressor is driven by an electric motor. The air powered motor is driven by compressed air from the reservoir tank. The air powered motor provides rotary power to an input shaft of the electric generator, wherein the generator produces electrical power. The system can be mounted onto a mobile platform for ease of transport. Also, storage batteries can be connected to the electric output of the generator. The output of the batteries can be connected to the electric motor of the air compressor unit.

6 Claims, 2 Drawing Sheets

ELECTRIC POWER SYSTEM

FIELD OF THE INVENTION

The present invention relates to systems for producing electric power.

BACKGROUND OF THE INVENTION

Electric power for residential and commercial use is typically produced by large generators in electric power plants. These generators are commonly driven by fossil fuel and nuclear energy sources. Fossil fuels include oil, natural gas and coal. Power plants utilizing these fossil fuels produce air pollution and greenhouse gases. Power plants utilizing nuclear fuels produce radioactive wastes. Storage of these wastes is highly controversial. Small portable electric generators are driven by internal combustion engines. These engines also produce air pollution due to the exhaust gases from the combustion.

Because these energy sources produce air pollution and storage problems, it is desired to develop a system for eliminating or at least minimizing reliance on such energy sources.

It is therefore an object of the present invention to provide a system that produces electrical energy without producing air or environmental pollution.

DESCRIPTION OF PREFERRED EMBODIMENTS

Figure 2:
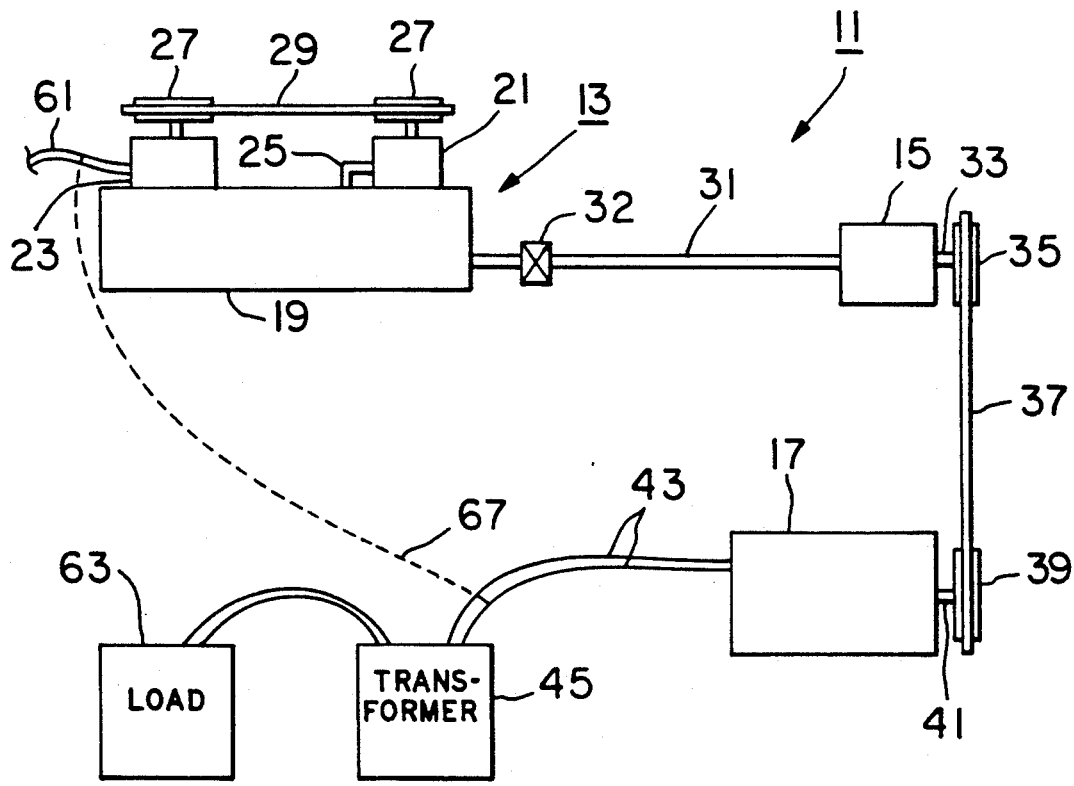
FIG. 2 is a schematic view showing the system of the present invention, in accordance with a preferred embodiment.

In FIG. 2, there is shown the system 11 of the present invention, in accordance with a preferred embodiment. The system 11 includes an air compressor unit 13, an air powered motor 15 and an electric generator 17.

The air compressor unit 13 is a conventional, commercially available unit. The air compressor unit 13 has a storage or reservoir tank 19, an air compressor 21 and a drive motor 23. The air compressor 21 and the motor 23 sit on top of the reservoir tank 19. The air compressor 21 is connected to the reservoir tank 19 by a conduit 25 so as to discharge compressed air into the tank. In the preferred embodiment, the air compressor has two stages and two cylinders. The air compressor 21 produces a discharge pressure of 0-300 psi, with a delivery of 18 cfm. The air compressor is powered by the electric motor 23, which is coupled to the air compressor by way of sheaves 27 and a belt 29. The electric motor 23 is powered by 240 volts ac through power cord 61.

The reservoir tank 19 has an outlet conduit 31 for conveying pressurized air to the air motor 15. The air motor 15 is a conventional, commercially available unit. When supplied with pressurized air, the air motor produces rotary power by way of rotating an output shaft 33. The output shaft 33 is fitted with a sheave 35 that receives a drive belt 37. In the preferred embodiment, the air motor 15 is a 4 horsepower motor and operates with an air pressure of about 110 psi. The air motor can operate at 1800 rpm. At this speed, the air motor produces about 10.5 foot-pounds of torque, which can operate a 16 kilowatt or larger generator.

The drive belt 37 is received by a sheave 39 on an input shaft 41 of the electric generator 17. The generator 17 is a conventional, commercially available unit. In the preferred embodiment, the generator is a 16 kilowatt ac synchronous generator, that produces 50 amps at 120 volts and 240 volts at 60 Hz. The electrical output 43 of the generator 17 can be connected to a step-up transformer 45 if a higher voltage or amperage is required.

Figure 1:
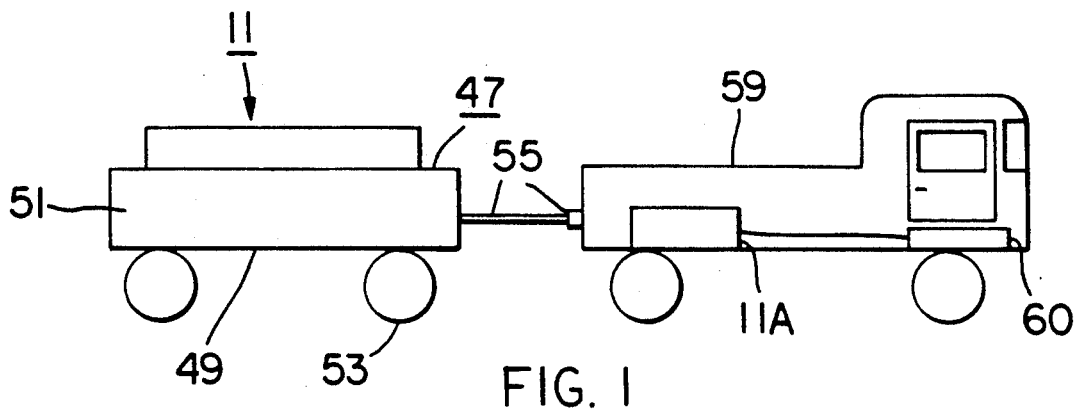
FIG. 1 is a schematic view showing the system of the present invention, which includes a mobile platform, that is connected to a towing vehicle.

All of the components can be mounted to a mobile platform such as a trailer 47 (see FIG. 1). The trailer has a bottom wall 49 and side walls 51. The trailer has wheels 53 and a hitch 55 to permit towing of the trailer behind a vehicle 59 such as a pickup truck. The mobile platform can be made smaller and lighter than a trailer so as to permit a human to push the system from place to place. Alternatively, the system 11A can be mounted in the vehicle 59 itself. The system 11A can be used to provide electrical power to drive the electric motor 60 that propels the vehicle.

The operation of the system 11 will now be described. The air compressor unit 13 is operated by connecting a power cord 61 of the electric motor 23 to an electric wall outlet or some other suitable energy source. The air compressor 21 is then allowed to operate so as to fill the reservoir tank 19 with air. Once the reservoir tank 19 has been filled with compressed air, the air compressor is unplugged from the wall outlet. The system 11 can be moved on the trailer 47 to whatever location is desired, even if that location is remote from the electrical wall outlet.

To generate electricity to drive a load 63, the air motor 15 is started by opening a valve 32 in the air line 31 to allow compressed air to flow from the tank 19 to the air motor 15. The compressed air from the reservoir tank 19 causes the air motor 15 to rotate, thereby rotating the drive belt 37. Thus, the air motor rotates the input shaft 41 on the electric generator 17 in order to produce electricity. The electrical outputs 43 of the generator provide the electricity for the load 63.

By utilizing compressed air to operate the system, no air pollution is created during the operation of the system at the location of operation. Thus, the system is useful in areas or circumstances where air pollution is undesirable or unacceptable. Some uses include residential, commercial and scientific uses. Furthermore, by charging the tank of air with power from the wall output, which is typically provided by a utility company, sources of distributed air pollution are reduced. Conventional small portable generators utilize an internal combustion engine to permit the rotary power that is required to drive the generator. These internal combustion engines produce air pollution and are not subject to air pollution controls. Utilities are subject to air pollution controls and provide scrubbers and the like to clean flue gasses to reduce air pollution. Because the air pollution is produced at a point source, namely a utility generating plant, the task of cleaning the air is simpler and more cost effective. This is not the case with conventional electric generators driven by conventional internal combustion engines. The system of the present invention prevents this distributed air pollution which is caused by internal combustion engines.

Figure 3:
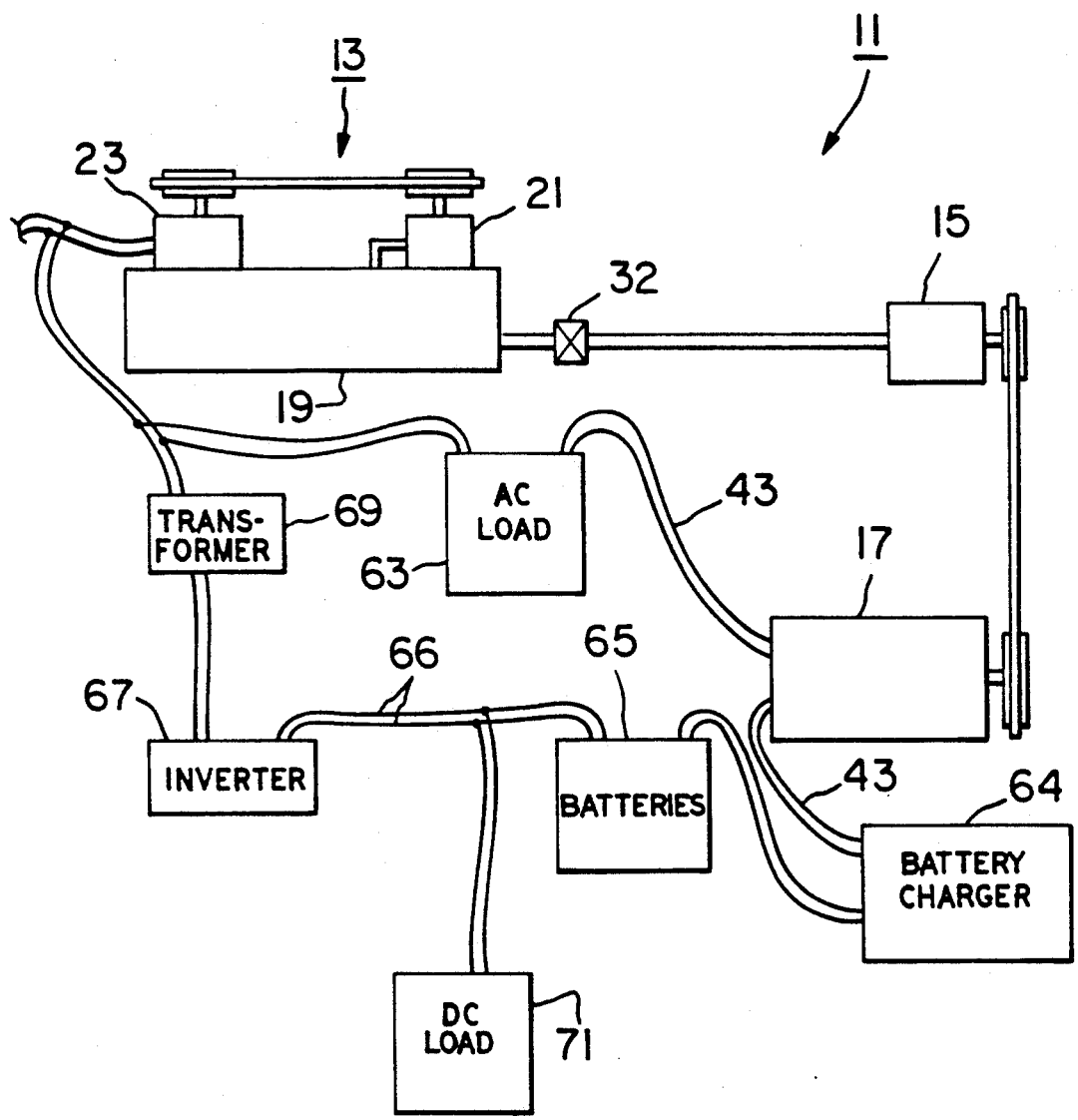
FIG. 3 is a schematic view showing the system of the present invention, in accordance with another embodiment.

The system 11 of FIG. 2 has a relatively short operating time, limited by the size of the reservoir tank. In FIG. 3, there is shown a modification of this system that extends the operating time. In the system of FIG. 3, the electrical outputs 43 of the generator 17 are connected to a battery charger 64. The battery charger 64 converts the ac output of the generator 17 to dc to allow charging of the batteries. The output of the battery charger 64 is connected to plural storage batteries 65. In the preferred embodiment, the storage batteries 65 are lead-acid batteries of the type used in automobiles. There are four 12 volt, 650 amp batteries connected in parallel to each other. The electrical output 66 of the batteries is connected to the input of an inverter 67. The inverter 67 converts dc to ac. The output of the inverter 67 is connected to the transformer, which steps up the voltage to drive a load 63 and the air compressor motor 23. Alternatively, the load 63 can be connected directly to the output 43 of the generator 17.

The electrical output 66 of the batteries can also be tapped to drive an electrical load 63. A step-up transformer 45 can be used. Alternatively, electrical power from the battery can be tapped from the output of the converter 69 if the load requires ac power.

The system of FIG. 3 operates as follows. The air compressor unit 13 is operated by the charged batteries 65 to fill the reservoir tank 19. Once the reservoir tank has been filled, the air compressor unit can be stopped. Alternatively, the system can be started by plugging the air compressor unit 13 into an electrical wall output by its power cord 61 for a sufficient period of time to fill the reservoir tank with compressed air. Once the reservoir tank has been filled, the air compressor 13 is unplugged from the wall outlet. The system can then be moved to the desired location by the trailer 47. When the need arises to drive a load 63 with electricity, compressed air is allowed to flow through the conduit by opening the valve 32 to the air motor 13, causing the air motor to rotate. The air motor 15 rotates the generator 17 to produce electricity. The generator 17 charges the storage batteries 65 via the charger 64. Electrical power is tapped from the storage batteries 65 to drive a load. The system can operate a dc load 71 (by tapping off of the batteries) or an ac load 63 (by tapping off of the generator or the inverter). A portion of the electrical power of the batteries 65 is used to operate the air compressor motor 23 to maintain compressed air inside of the reservoir tank 19. Use of the system of FIG. 3 allows the provision of electrical power for an extended period of time. Alternatively, the generator 17 of FIG. 3 can directly drive the motor 23 of the air compressor unit 13 through wires 43. Thus, the generator 17 drives the motor 23 and any other load 63 such as another electric motor. The load motor 63 could, for example, be used to power a vehicle such as an electric car.

The foregoing disclosure and the showing made in the drawings are merely illustrative of the principles of this invention and are not to be interpreted in a limiting sense.

I claim:

1. A system for producing electric power, comprising:
   a) an air compressor unit, said air compressor unit comprising an air compressor, a storage tank connected to an output of said air compressor, and an electric motor for operating said air compressor;
   b) an air powered motor having an air inlet and a shaft that is rotated by air entering said air inlet, said air inlet being connected to an air outlet on said air compressor storage tank;
   c) an electric generator having a rotatable shaft that is rotatably coupled to said shaft of said air powered motor, said generator having electrical outputs;
   d) electrical storage batteries connected to the electrical outputs of said generator, wherein said batteries are charged by said generator;
   e) means for converting dc electrical power to ac electrical power, said converter means having an input connected to an output of said batteries and an output connected to said electric motor of said air compressor unit.

2. The system of claim 1 further comprising a mobile platform, said air compressor unit, said air power motor and said generator being located on said platform.

3. The system of claim 1 further comprising a step-up transformer connected to the output of said means for converting dc electrical power to ac electrical power.

4. The system of claim 1 further comprising a valve connected to said air outlet on said air compressor storage tank, said valve for controlling the flow of compressed air to said air powered motor.

5. The system of claim 1 further comprising a step-up transformer connected between said converter means and said electric motor of said air compressor unit.

6. A system for producing electric power, comprising:
   a) an air compressor unit, said air compressor unit comprising an air compressor, a storage tank connected to an output of said air compressor, and an electric motor for operating said air compressor;
   b) an air powered motor having an air inlet and a shaft that is rotated by air entering said air inlet, said air inlet being connected to an air outlet on said air compressor storage tank;
   c) an electric generator having a rotatable shaft that is rotatably coupled to said shaft of said air powered motor, said generator having electrical outputs which are adapted to be connected to an electrical load;
   d) electrical storage batteries connected to the electrical outputs of said generator;
   e) means for converting dc electrical power to ac electrical power, said converter means having an input connected to an output of said batteries and an output connected to said electric motor of said air compressor unit.

* * * * *